United States Patent [19]
Howard

[11] Patent Number: 5,589,229
[45] Date of Patent: *Dec. 31, 1996

[54] COMPOSITION AND METHOD FOR PREVENTING MOSS GROWTH ON ROOFS

[76] Inventor: Richard Howard, 30311 Camas Swale Rd., Creswell, Oreg. 97426

[ * ] Notice: The term of this patent shall not extend beyond the expiration date of Pat. No. 5,366,767.

[21] Appl. No.: 342,757

[22] Filed: Nov. 21, 1994

Related U.S. Application Data

[63] Continuation-in-part of Ser. No. 120,949, Sep. 14, 1993, Pat. No. 5,366,767.

[51] Int. Cl.$^6$ .................................. B05D 7/00; C09D 5/14
[52] U.S. Cl. .................... 427/421; 427/294; 427/296; 427/297; 427/397.8; 427/427; 106/15.05; 106/18.12; 106/18.32; 106/600; 106/634
[58] Field of Search ..................................... 427/421, 427, 427/397.8, 297, 294, 296; 106/18.12, 15.05, 634, 600, 18.32; 239/159; 118/305

[56] References Cited

U.S. PATENT DOCUMENTS

| | | |
|---|---|---|
| 55,216 | 5/1866 | Ransome . |
| 2,661,982 | 12/1953 | Hudson .................................. 239/159 |
| 3,180,746 | 4/1965 | Patton et al. . |
| 3,721,574 | 3/1973 | Schneider et al. . |
| 3,888,684 | 6/1975 | Little . |
| 3,998,644 | 12/1976 | Ledge . |
| 4,137,087 | 1/1979 | Blasko et al. . |
| 4,179,535 | 12/1979 | Kalbskofp et al. . |
| 4,272,935 | 6/1981 | Lukas et al. . |
| 4,338,374 | 7/1982 | Neser . |
| 4,432,798 | 2/1984 | Helferich et al. . |
| 4,443,496 | 4/1984 | Obitsu et al. . |
| 4,521,333 | 6/1985 | Graham et al. . |
| 4,535,002 | 8/1985 | Kirkhuff . |
| 4,612,050 | 9/1986 | Hicks . |
| 4,710,309 | 12/1987 | Miller . |
| 4,737,154 | 4/1988 | Gaines et al. . |
| 4,879,066 | 11/1989 | Crompton . |
| 4,886,548 | 12/1989 | Helmstetter . |
| 5,060,445 | 10/1991 | Jong . |
| 5,366,767 | 11/1994 | Howard ................................. 427/294 |

FOREIGN PATENT DOCUMENTS

| | | |
|---|---|---|
| 2136824 | 9/1984 | United Kingdom . |

OTHER PUBLICATIONS

"Bonding and Coating Applications of PQ® Solulable Silicates", The PQ Corporation, Bulletin 12–31.
"Sodium Silicates Liquids/Solids", The PQ Corporation, Bulletin 17–103.
Product Bulletin from Van Waters & Rogers Inc., subsidiary of Univar.

Primary Examiner—Shrive Beck
Assistant Examiner—David M. Maiorana
Attorney, Agent, or Firm—Kolisch, Hartwell, Dickinson, McCormack & Heuser

[57] ABSTRACT

A penetrant composition for applying to and penetrating into weather exposed surface materials to prevent moss growth thereon is described. The composition is an aqueous solution containing $Na_2O$, $SiO_2$ and a surfactant for increasing the permeability of the composition into the surface material. A method of protecting weather exposed surface material from moss growth thereon is also described. The method involves the steps of providing a composition including water, $Na_2O$, $SiO_2$ and a surfactant. Approximately 1 gallon of the composition is applied per 100 square feet of surface to be protected. The composition is allowed to dry on and in the surface material at ambient temperatures.

2 Claims, 4 Drawing Sheets

COMPOSITION AND METHOD FOR PREVENTING MOSS GROWTH ON ROOFS

This is a continuation-in-part from U.S. Pat. No. 5,366,767 filed on Sep. 14, 1993 as Ser. No. 120,949.

FIELD OF INVENTION

The invention relates to a penetrant composition and method of using the composition to prevent moss growth on roofs. More specifically, the invention involves an aqueous composition containing $Na_2O$ and $SiO_2$ which is applied and allowed to penetrate into porous weather exposed material to prevent moss growth.

BACKGROUND OF THE INVENTION

Roofing and other weather exposed materials are exposed to the effects of sunlight and moisture resulting in physical and chemical changes, commonly called weathering. Initially, weathering results from the sun's ultraviolet rays which dull the color of the roof material, generally lightening the color of the roof. Gradually, the roof is colonized by microfungi which darkens the color of the roof material. As the roof continues to age, the surface and sharp edges of the roof are eroded by continued exposure to heat and cold and from abrasive particles carried by wind and rain. Roof material destroying organisms, such as moss, further degrade the roof's surface and edges. Loose debris from trees may begin to accumulate on the roof, particularly in recesses such as between shakes or tiles and in bends or corners of the roof. After each rain, these areas remain moist for a longer time than roof areas exposed to direct sunlight. Because of these moist conditions, moss growth is increased.

Moss damages the roofs in at least two ways. First, during a rain, the moss retards the shedding of water, which promotes leaks and roof rotting. Second, after the rain stops, the moss prevents the roof material from drying, which further encourages the growth of additional roof destroying organisms.

The most common currently used method for removing moss from roofs involves washing the roof under high pressure and then treating the roof with an oil-based sealer and/or U-V blocking agent such as zinc. During pressure washing, water is applied to the roof material at a pressure of approximately 2500 to 3500 pounds per-square-inch. Pressure washing removes most of the moss, but at the same time tears away the outer roof material. After pressure washing, the roof is thinner by as much as an eighth to a quarter of an inch. Thus, pressure washing removes years of useful life from the roof by literally removing the exposed outer surface of the roof material. Furthermore, after pressure washing, the former roof material must be cleaned out from gutters and off siding, windows, lawns, shrubs and sidewalks.

After pressure washing, oil-based sealing agents are applied to the roof material. It is believed that treatment with "replenishing oils" seals the roof against further weathering. However, the natural oil coating may actually provide an additional food source for moss. Furthermore, the petroleum-based oil products are likely to be oxidized (broken down) by sunlight, reducing the life of the oil, while increasing the flammability of the roof.

Another moss growth prevention method used after pressure washing involves metal based treatments. Typically, a zinc or other metal based solution is applied to the roof. However, these zinc and other metal based solutions are environmentally unsafe and often damage gutters, stain concrete, and poison the surrounding landscape.

The use of metals such as zinc and copper, to kill lichens, such as algae and fungi, on roofs is described in Little, U.S. Pat. No. 3,888,684. Specifically, Little describes granules coated with an inner and outer coating, each such coating containing algicidal compounds, such as zinc and copper ions. When exposed to moisture, the granules' inner and outer coatings leach the zinc and copper ions to produce a bimetallic effect to retard the growth of lichens, such as algae and fungi. The copper and zinc containing granules disclosed in Little have the disadvantage of being environmentally toxic. In addition, the granules themselves are easily washed off the roof by rain, thereby rendering the granules ineffective.

Lodge, U.S. Pat. No. 3,998,644, also describes a metal based roof coating for preventing algae growth. Specifically, Lodge describes an alkaline metal silicate with zinc hydroxychloride dispersed in a solution. The composition is applied to a roof, forming a hard coating on the roof. The zinc metal based treatment described in Lodge has the disadvantage of being environmentally toxic. An additional drawback is that the hard coating may break down during weathering, leaving portions of the roof unprotected.

No one has previously disclosed an environmentally compatible penetrant composition which is effective for preventing moss growth on roofs.

Therefore, objects of the present invention are to provide a stable, non-oil based, non-toxic, non-flammable composition which does not include toxic metals such as zinc or copper, which is cost effective to produce and apply, and effective for removing moss from numerous different porous weather exposed surfaces, particularly roofs, without pressure washing, without causing deterioration of gutters or downspouts, without harming plants or animals, resulting in a lengthening of the life of the weather exposed surface.

SUMMARY OF THE INVENTION

The penetrant composition of the present invention, for applying to and penetrating into porous weather exposed surfaces to prevent moss growth, is preferably an aqueous solution, having a pH of at least 11.0, containing $Na_2O$ and $SiO_2$ at a combined concentration between 10% and 30% (W/V) and a surfactant composition for increasing the permeability of the penetrant composition into the exposed surface without causing the $Na_2O$ and $SiO_2$ to precipitate. The invention further includes a method of preventing moss growth on a weather exposed surface. A preferred method of the present invention involves spraying the penetrant composition onto a roof at a rate of approximately one gallon of penetrant composition per 100 square feet of surface.

DETAILED DESCRIPTION OF THE INVENTION

Figure 1:
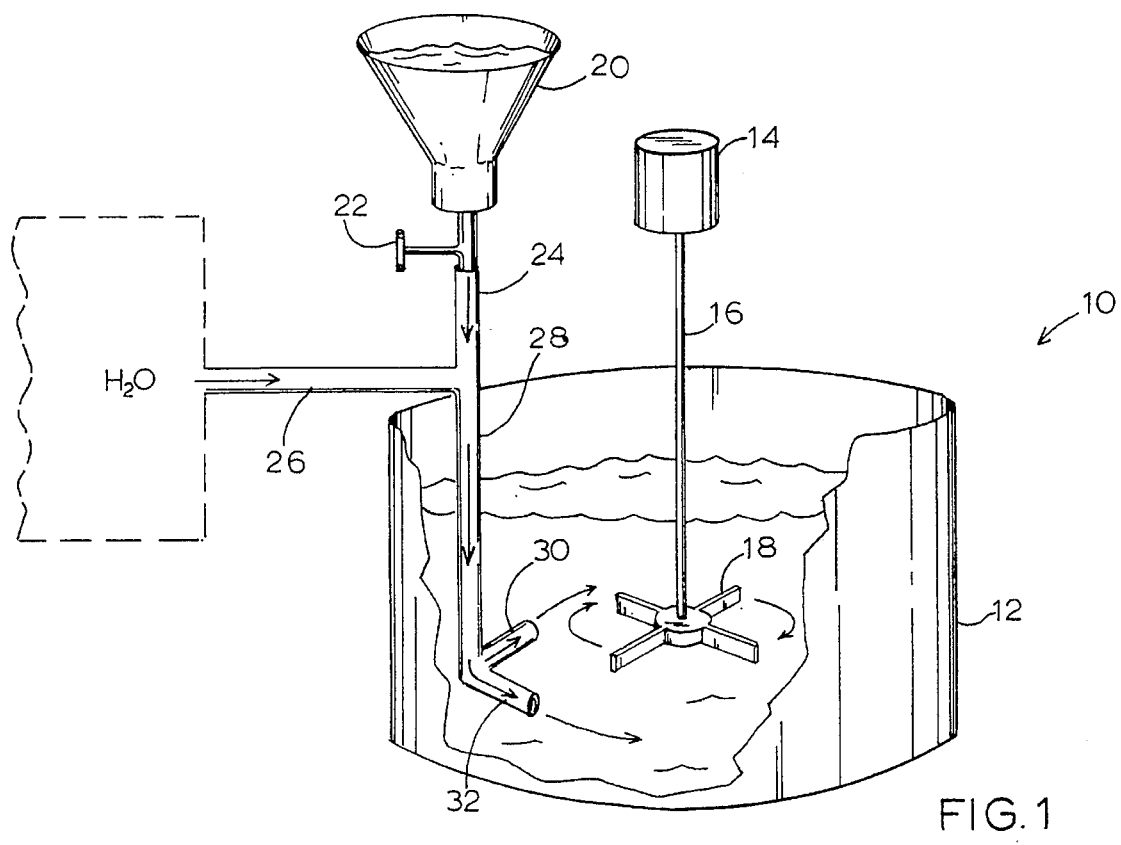
FIG. 1 is a schematic perspective cut-away view of an apparatus for mixing compositions of the present invention.

The invention involves a penetrant composition for applying to and penetrating into weather exposed surfaces to prevent moss growth. The penetrant composition is principally an aqueous solution containing $Na_2O$ and $SiO_2$. A preferred formulation of the penetrant composition includes a surfactant capable of increasing the permeability of the composition into the exposed surface material without causing the $Na_2O$ and $SiO_2$ to precipitate. The solution typically has a $SiO_2/Na_2O$ weight ratio in the range of 1.5 to 3.3, and preferably a weight ratio of 3.2. The pH of the solution is at least 11.0 and preferably 11.3.

Sodium silicate stock solutions can be obtained from the PQ Corporation, industrial chemicals division, under the trademark product names STIXSO RR, N, E, O, K, N, STAR, RU, V, C, STARSO and B-W. In the preferred embodiment the N type sodium silicate solution is diluted with water in a one to one volume ratio.

Sodium silicate solutions are generally inexpensive in comparison to the metal based compounds which have been used on roofs in the past. In addition, sodium silicate residue which remains after a solution is applied to a surface and has dried is nonflammable, resistant to temperatures up to 3000° F., odorless, non-toxic and moisture resistant.

When the silicate solutions are completely dehydrated, they provide excellent resistance to high temperature. Most silicates used for binders have softening points at approximately 1200° F. and flow points of 1500° F. to 1600° F. This temperature resistance reduces the flammability of any material into which the silicate solution has permeated. Furthermore, the soluble silicates are ideal for impregnating fibrous materials, particularly building materials. In addition to the fire-proofing qualities, silicate adhesives provide good wet strength as well as dry bond strength, and excellent overall adhesion.

Sodium silicates are made from sand and alkali and are universally judged to be non-toxic and ecologically harmless in fresh water environments. They are completely inorganic and therefore do not present hazards of explosion or flammability.

Thus, weather exposed material into which a sodium silicate solution has penetrated, is more resistant to high temperatures, is less flammable and has increased material strength, as a result of the sodium silicate solution. In addition, the sodium silicate impregnated weather exposed material has no increased toxicity or environmentally harmful characteristics.

The penetrant composition of the present invention includes a surfactant composition which increases the permeability, or penetration, of the composition into the weather exposed material without causing the sodium silicate to precipitate. The surfactant composition wets the solution and acts as a carrier, increasing the permeability of the penetrant composition into pores of the exposed surface material. The preferred surfactant composition is a blend of hydrotope surfactants (chemicals which have the property of increasing the aqueous solubility of slightly soluble organic chemicals), and/or including an amide surfactant (chemicals which have the property of increasing the aqueous solubility of meta-silicates in solution). In the preferred embodiment, the surfactant is Biosoft LD-190 (a registered U.S. trademark), a detergent concentrate sold by Stepan and by Van Waters & Rogers Inc., a subsidiary of Univar. Typically 1.5 gallons of Biosoft LD-190 is added to 550 gallons of the sodium silicate solution. Biosoft LD-190 is a clear to hazy yellow liquid of 90% to 93% solids, has a pH of approximately 8.5, a viscosity of 350 centipoise, and is not believed to be a hazardous material under current Department of Labor definitions. Another surfactant which has been found to work is Biosoft LD-95, sold by the same manufacturers. Typically 2.0 gallons of Biosoft LD-95 is added to 550 gallons of the sodium silicate solution. Biosoft LD-190 is preferred over Biosoft LD-95 because only 1.5 gallons of Biosoft LD-190 is required, compared to 2.0 gallons of Biosoft LD-90, to achieve the same penetration into roof materials.

The surfactant acts as a wetting agent by decreasing the viscosity of the solution and altering the surface tension of the solution thereby promoting penetration of the composition into the surface pores. The surfactant must be carefully selected so that it does not force the sodium silicate to precipitate out of the solution which would defeat the purpose of using a surfactant. The preferred surfactant, Biosoft LD-190, produces a stable solution with the sodium silicate such that the sodium silicate does not precipitate out of solution when the surfactant is added.

A pigmented colorant may also be added to the penetrant composition for the purposes of: 1) blocking ultraviolet light which, otherwise, contributes to degradation of the roof material; and/or 2) staining or altering the color of the roof for aesthetic reasons. The type of colorant which is selected for use in the present invention must be compatible with a highly alkaline (pH of approximately 11.0) aqueous solution.

A colorant may also be added so that a user can readily distinguish the penetrant composition from other solutions or liquids which are colorless. For example, the composition may include a colorant, such as tartrazine™, which turns the composition from its normal colorless state to a bright yellow color. Adding such a colorant increases the safety of handling the composition because the composition can be readily seen and distinguished from water or undiluted sodium silicate solution.

In a preferred embodiment, the penetrant composition comprises about 4.5% (W/V) $Na_2O$ and 14.3% (W/V) $SiO_2$ in water. The desired sodium silicate solution is produced by mixing one part water with one part of the N® type sodium silicate stock solution as provided by the PQ Corporation. Through experimentation, the results of which are given below, the inventor has found that the above mentioned sodium silicate concentration is preferable because if the sodium silicate concentration is too high, the solution is too viscous which makes it difficult to apply and prevents it from penetrating adequately. If the sodium silicate solution is too low the solution is too dilute resulting in an inadequate quantity of sodium silicate being deposited per unit area. The surfactant composition, preferably 1.5 gallons of Biosoft LD-190, is added to 550 gallons of the silicate solution mixture before the penetrant composition is applied to a surface.

In the method of the present invention the penetrant composition described above is applied to a roof in an amount of approximately 1 gallon of penetrant composition per 100 square feet of roof. The composition is then allowed to dry on the roof at ambient temperatures. Typically, southern and western exposed surfaces are more weathered, e.g., more porous, than northern and eastern exposed surfaces. South and west exposed wooden roofs have more dry rot and sun blisters than north and east exposures, which may result in cracked and warped surfaces. Due to the increased weathering on the south and west exposures, typically, 1.5 gallons of penetrant is applied per 100 square feet of surface. On the north and east surfaces, 0.75 gallons are applied per 100 square feet, resulting in an average of 1.0 gallons per 100 square feet for the entire roof.

The moss preventative method of the present invention may be widely used on a variety of porous surfaces such as roofing materials including, but not limited to, wood shake, composition, ceramic, tile, etc., many types of siding, concrete walls or sidewalks, docks, fences, asphalt, retaining walls, concrete bridges or any other weather exposed surface which is porous and tends to support moss growth. In addition, the present invention may be used to spray trees and shrubs having moss or other parasitic growth thereon. Typically, trees are sprayed during the winter after the trees' leaves have dropped.

It is believed that the penetrant composition prevents moss growth on such surfaces by establishing a highly alkaline environment of pH 11.0 or greater. Moss cannot grow in such an alkaline environment and quickly dies. Consequently, the treatment is effective for both the purposes of killing existing moss and preventing further moss growth. The composition is applied to the surface to be protected and penetrates into the pores of the surface. After penetration, the composition drys by evaporation, setting the composition in the surface material. Once set in the pores of the material, the composition maintains a pH level of 11.0 or greater, thereby killing existing moss and preventing further moss growth in or on the surface material.

When applying the inventive composition to asphalt roofs having a granuletype surface, approximately 0.5 gallons per 100 square feet is used. Less of the penetrant composition per square foot is used than on wooden roofs because asphalt is much less porous than wood. Approximately 1 gallon of penetrant is applied to tile roofs per 100 square feet of surface because tile roofs have approximately the same porosity as wood. Approximately 0.75 gallon of penetrant is applied to concrete per 100 square feet of surface.

In a preferred method, the penetrant composition is applied by pumping and spraying the composition onto the roof. A diaphragm pump is advantageous for this purpose so that the composition does not come in contact with the working mechanisms of the pump, and therefore cannot crystalize and clog the pump.

Once applied to an exposed surface having moss growing thereon, the penetrant composition kills the moss in a short period of time. When the penetrant composition is applied to wooden roofs at an ambient temperature of 95° F., the moss is killed and turns brown within one minute. When the ambient temperature is 70° F. and the sky is sunny, the moss is killed and turns brown in ten minutes or less. When the ambient temperature is 70° F. and the sky is cloudy, the moss may take up to one hour to die and turn brown.

Dead moss typically washes away with rain. On old wooden roofs, having worn, highly porous surfaces, the moss may be washed off in one or two rainy seasons. For wooden roofs under 15 years of age, only half a rainy season may be required to wash away the dead moss. A wooden roof only one or two years old may be washed clean in one heavy rain. A customer may speed up moss removal by spraying the roof with water from a garden hose. On old asphalt roofs, moss is typically removed in one to two rainy seasons. On old tile roofs, moss is typically washed away in one rainy season. On concrete surfaces, such as retaining walls and driveways, the moss can be washed away almost immediately with a garden hose.

Before spraying a surface with the penetrant composition, the surface must be dry to the touch. If the surface is wet, the penetrant composition cannot penetrate the already water-filled pores and the composition merely runs off the surface. Typically, such wet surfaces dry overnight, allowing application of the inventive composition during the following afternoon.

The sodium silicate, in undiluted stock form (8.90% $Na_2O$ and 28.7% $SiO_2$) penetrates wood roofs to a depth of approximately $1/16$-inch. When the sodium silicate stock solution is diluted one to one with water, the mixture penetrates wood roofs to a depth of $3/16$-inch. Diluting the stock solution decreases the viscosity of the sodium silicate, facilitating the increased penetration. The preferred penetrant composition, including sodium silicate and surfactant (0.27% Biosoft LD-190) at the preferred concentrations, penetrates wood roofs to a depth of $5/16$-inch. The surfactant wets the sodium silicate solution, further increasing the penetration of the penetrant composition.

Further penetration of the penetrant composition into a porous surface can be achieved by pressure treatment. For example, a wood shake which is intended for use on a roof is put into a pressure chamber where the pressure is lowered substantially below ambient atmospheric pressure. The penetrant composition of the present invention is added to the pressure chamber. Next, the pressure in the chamber is raised causing the penetrant composition to be forced deeply into the pores of the shake. It is believed that surfaces which are pressure treated with the penetrant composition of the present invention would be resistant to moss growth throughout the useful life of the material.

The inventor has conducted numerous experiments regarding his invention. Specifically, the inventor has applied the inventive composition to exposed surfaces, and has observed the surfaces for several years. During this observation period, the inventor has noted the effects of weathering and the durability of the surfaces to which the composition has been applied. The inventor has also noted the growth, or lack of growth, of moss on roofs under varying conditions and in different geographical locations. The inventor has compared the test surfaces with control surfaces which have not received an application of the inventive composition. The inventor has applied the penetrant composition to one-half of a surface, to allow a direct side-by-side experimental comparison between the treated half and the non-treated half. In addition, the inventor has experimented by trying numerous dilutions of the sodium silicate solution, numerous types of surfactants, and has applied the penetrant composition to numerous types of weather exposed materials. A summary of the most pertinent experiments are given below.

Experiment 1

In a first set of experiments, the inventor varied the concentration of sodium silicate in the penetrant composition. The inventor determined that compositions comprising less than approximately 10% (W/V) sodium silicate were inadequately effective for preventing moss growth. The inventor believes that the reason for this is that there is a limited amount of absorbent capacity for a given surface, at least partially depending on the number and size of the pores; and that simply spraying a larger volume of a more dilute solution does not result in the desired post-dehydration amount of solids because after the surface is saturated, excess solution tends to run off the surface. In order to achieve the desired surface environment having a pH of at least 11.0 by using a sodium silicate solution of less than 10% (W/V) it is necessary to apply multiple coats with drying steps between each coat which is impractical and costly. Such dilute solutions would also require a longer drying time, also called evaporation time, to set the composition in the surface material. The inventor also found that solutions with more than approximately 30% (W/V) were inadequately effective because the solution was too viscous to effectively penetrate the roof and it tended to clog pumps and sprayers.

Experiment 2

In a second set of experiments, the inventor varied the type of surfactant composition, while holding the concentration of sodium silicate constant. The results of these experiments are shown below in Table 1. (Column 2 represents the number of gallons of surfactant added to 550 gallons of pure water/sodium silicate mixture).

TABLE 1*

| Surfactant | Hydrotopic Blend | Volume Added | Amide | Increased Penetration | Stability |
|---|---|---|---|---|---|
| Biosoft LD-190 | yes | 1.5 gal. | yes | yes | yes |
| Biosoft LD-95 | yes | 2.0 gal. | yes | yes | yes |
| Bioterge 804 | no | 1.5 gal. | no | no= | no |
| Bioterge AS40 | no | 1.5 gal. | no | no= | no |
| Bioterge DAS85 | no | 1.5 gal. | no | no= | no |
| Van Wet 9N9 | no | 1.5 gal. | no | no= | no |

*all surfactants listed are believed to be registered U.S. trademarks
=after formation of sodium silicate precipitate The surfactants which are not blends of hydrotopes or amides caused the sodium silicate to precipitate, i.e., the surfactants did not produce a stable penetrant composition. Thus, these surfactants did not achieve the desired result of wetting the sodium silicate solution and did not increase the penetration of the composition into the surface material to be protected because they caused the sodium silicate to precipitate. In contrast, the two listed hydrotopic blend surfactants, particularly Biosoft LD-190, increased the permeability of the composition into surface materials to be protected by as much as 3/16 of an inch without forcing the sodium silicate out of solution. The increased penetration of the composition resulted in increased protection against moss growth on the exposed surface. The inventor also found that less Biosoft LD-190 was required compared to Biosoft LD-95 to achieve the same penetration enhancing qualities.

Experiment 3

In a third set of experiments, the inventor investigated the effectiveness of the invention on a range of different weather exposed surface types. Specifically, the inventor applied the inventive composition to wooden or shake style roofs, composition roofs, tile roofs and asphalt roofs. The inventor also applied the penetrant composition to patios, fencing, wood siding, docks, driveways and concrete work including retaining walls, patios and sidewalks. Through such experiments, the inventor has determined that the inventive composition and method prevents moss growth on all such listed surfaces by penetrating into and setting in the pores of the surfaces. The inventor has found that the penetrant composition kills moss and prevents further moss growth on all such surfaces.

EXAMPLE 1

Figure 2:
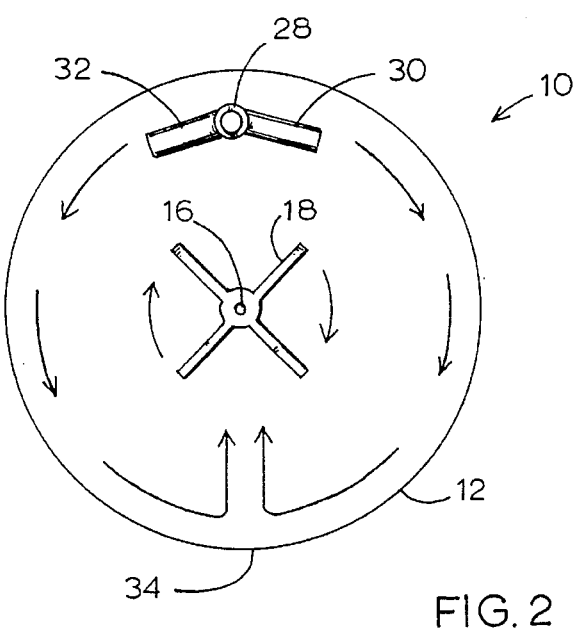
FIG. 2 is a schematic partial top view of the apparatus illustrated in FIG. 1.

The following discussion is a description of a preferred method of producing a batch of approximately 550 gallons of penetrant composition. FIGS. 1 and 2 illustrate an apparatus which is used in the method. As shown in FIG. 1, mixing device 10 includes a large, generally circular, mixing vessel 12. A motor 14 rotates shaft 16 so that paddles 18 rotate in the direction shown by the arrows. A cone-shaped hopper 20 is positioned above vessel 12, and has a valve 22 which can be manipulated to control output from hopper 20 into pipe 24. Pipe 26 intersects pipe 24. Pipe 26 primarily delivers water for mixing with a pre-mixture contained in hopper 20, and subsequently with the solution contained in vessel 12. Pipe 28 extends downward into vessel 12, and eventually splits into two pipes 30 and 32 which direct solution in opposite directions around vessel 12. As shown in FIG. 2, the two oppositely directed streams derived from pipes 30 and 32, collide near side 34 of vessel 12, and are then redirected toward paddles 18.

A batch of approximately 550 gallons of penetrant composition can be produced as follows. Approximately 275 gallons of N® type sodium silicate stock solution, as provided by the PQ Corporation, is poured into the bottom of vessel 12. Next, a surfactant admixture is produced by mixing 1 gallon of Biosoft LD 190™ with 4 gallons $H_2O$ and one heaping tablespoon of tartrazine (125%) powder. The surfactant admixture is completely mixed until all of the colorant is dissolved. The surfactant admixture is then loaded into hopper 20 with valve 22 in the closed position. Valve 22 is open while approximately 270 gallons of water is pumped through pipe 26. Valve 22 is preferably controlled so that the flow of the surfactant admixture from hopper 20 is substantially constant while water is added through pipe 26.

It is preferable for the subcomponents of the composition to be preheated in the range of approximately 80 to 100 degrees Fahrenheight, before mixing. When the solutions are preheated, the final solution only needs to be paddle mixed for approximately five minutes. In contrast, if the subcomponents (sodium silicate solution, surfactant admixture and water) are not preheated (for example, if they are about 50 degrees Fahrenheight) then the final mixture should be paddle mixed for approximately 1 to 1½ hours.

In a modified process, the concentration of surfactant in the admixture is decreased to approximately 1 gallon surfactant in 10 gallons of admixture.

The ratio of sodium silicate to water is varied somewhat depending on whether the roof is wet. If the roof is essentially dry (summer conditions), then the ratio of N™ type stock solution (sodium silicate) to water is approximately 1:1 (V/V). If the roof is quite wet (post-rain), then the amount of water is decreased slightly, for example, to a ratio of 1:.95.

EXAMPLE 2

The following example illustrates preferred methods of applying penetrant composition to a roof.

It is important to apply penetrant composition to a roof in an evenly distributed manner. As already noted, the preferred quantity or density of application is approximately 0.75 to 1.5 gallons of penetrant composition per 100 square feet of roof. If insufficient composition is applied, moss may continue to grow and cause degradation of the roof. Conversely, over applying the composition is wasteful and expensive.

Accordingly, I have invented devices which facilitate easy and uniform application of the penetrant composition on a roof.

Figure 5:
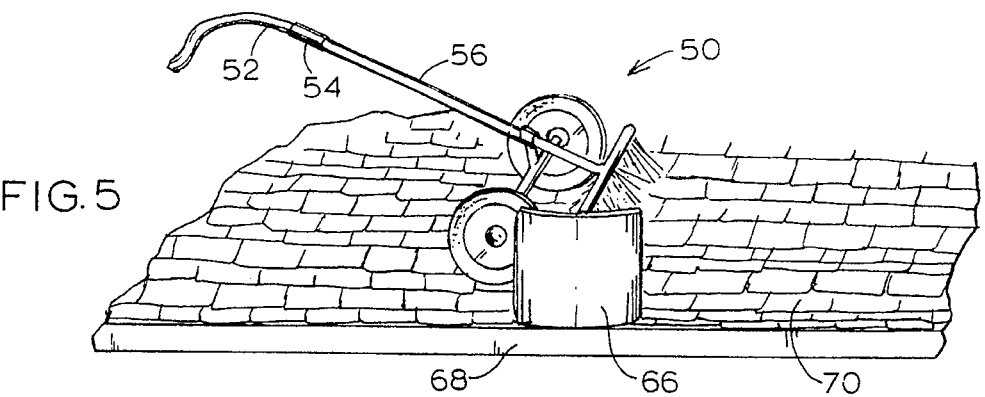
FIG. 5 is a schematic side perspective view of the apparatus shown in FIG. 3, on a roof.
Figure 3:
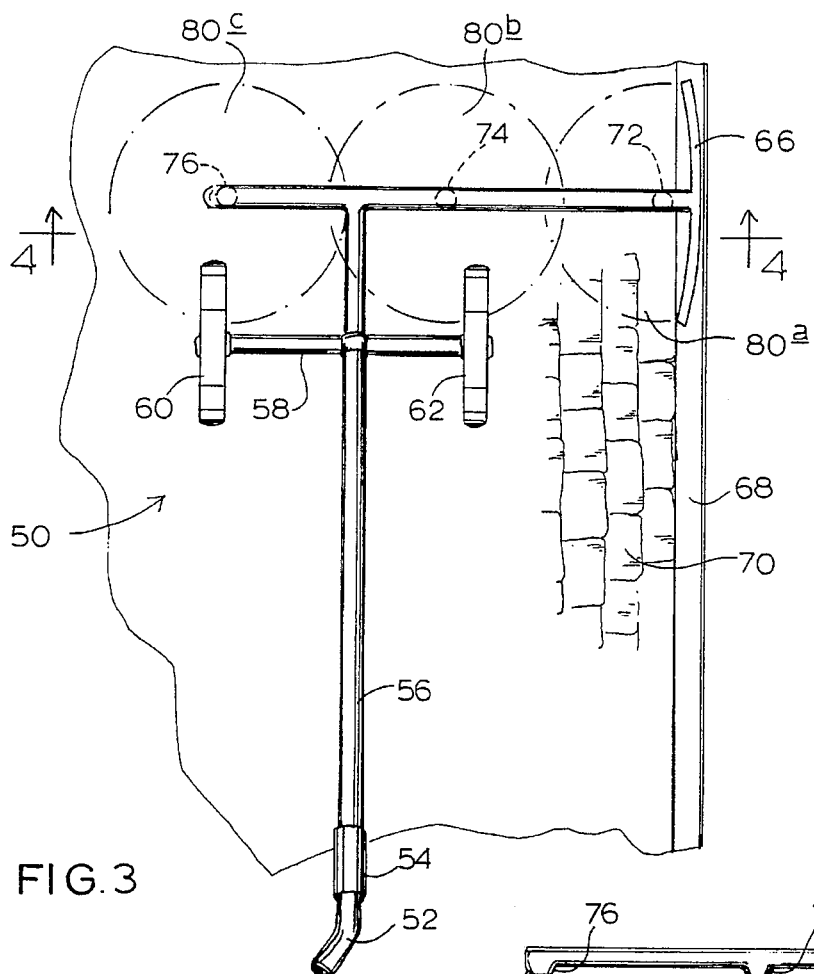
FIG. 3 is a schematic view of an apparatus of the present invention employed to deposit penetrant composition on a roof.
Figure 4:
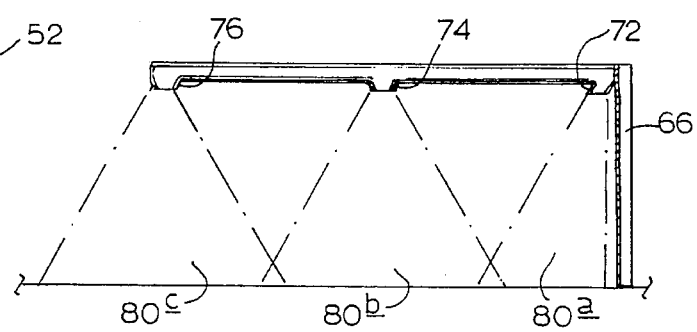
FIG. 4 is a schematic partial end view of the apparatus shown in FIG. 3.
Figure 7:
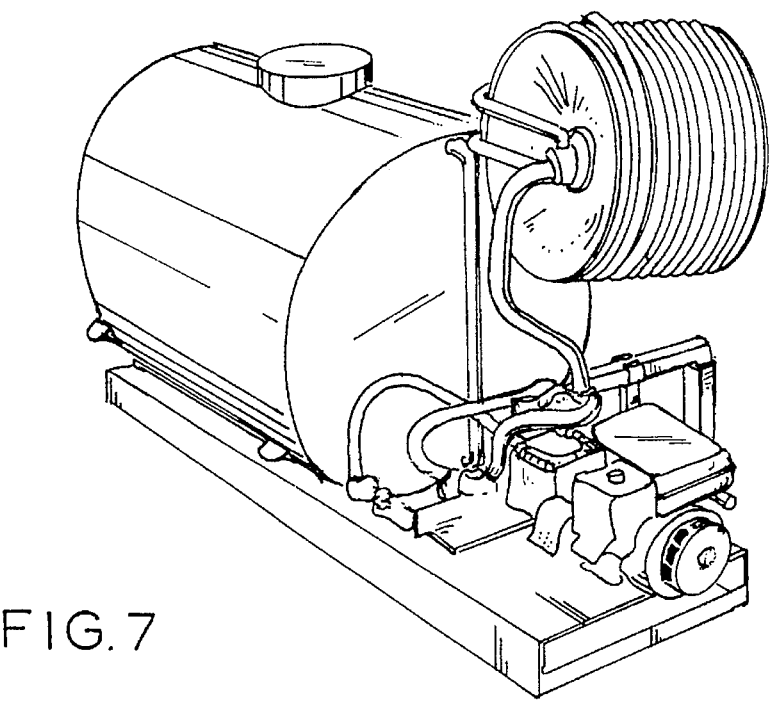
FIG. 7 is a perspective view of a tank, pump and hose for use in an application process of the present invention.
Figure 8:
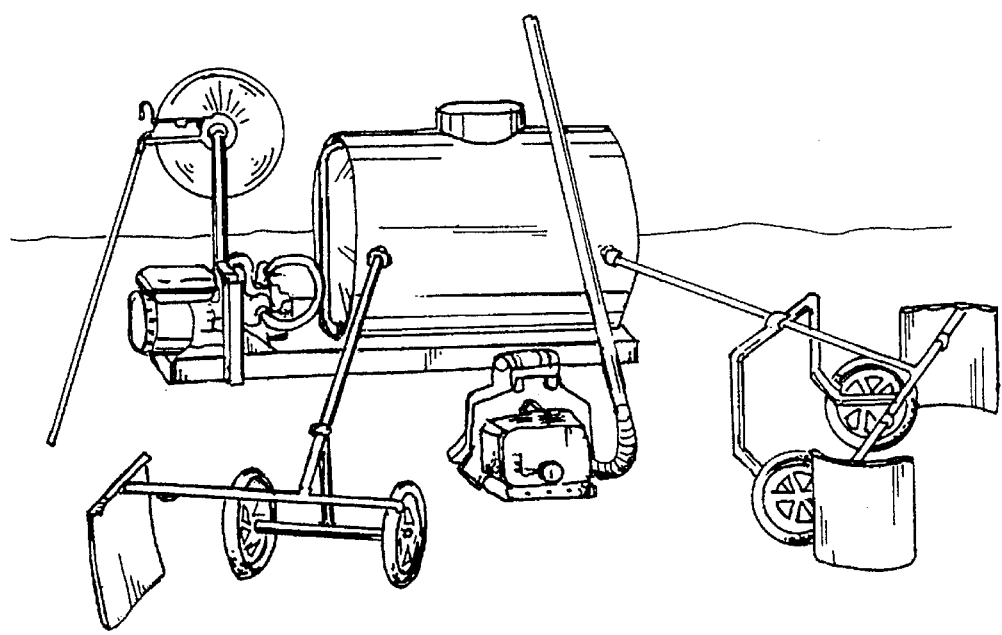
FIG. 8 is a perspective view of a tank and two applicators which are used in a preferred method of applying penetrant composition to a roof.

FIGS. 3, 4 and 5 illustrate an application device which is especially designed to apply penetrant composition near the edge of a roof or on a relatively narrow roof region, for example, around a chimney, skylight, etc. As shown in FIG. 3, applicator 50 has a conduit 52 through which penetrant composition is supplied, i.e. pumped, from a tank (FIGS. 7 and 8). Conduit 52 may be connected to applicator 50 near or through handle 54. Alternatively, conduit 52 may be connected to another tube portion of applicator 50. Handle 54 is connected to one end of hollow shaft 56. An on/off switch or valve is provided on handle 54. Cross bar 58 is connected to shaft 56 and serves as an axle or support member for wheels 60 and 62. A second cross bar 64 extends laterally to one side. Cross bar 64 is hollow and receives penetrant composition from conduit 52 and the tank. A guard or deflector 66 is attached to the distal end of cross bar 64 for blocking penetrant composition from spraying off the roof. Deflector 66 is typically aligned near gutter 68 on the edge of roof 70. Nozzles 72, 74 and 76 (shown in dash lines) protrude from the bottom of cross bar 64, and direct composition in spray zones 80a, 80b and 80c, respectively. FIG. 4 shows another view of nozzles 72, 74 and 76, and spray zones 80a, 80b and 80c. FIG. 5 shows a side view of applicator 50 on the edge of roof 70.

Figure 6:
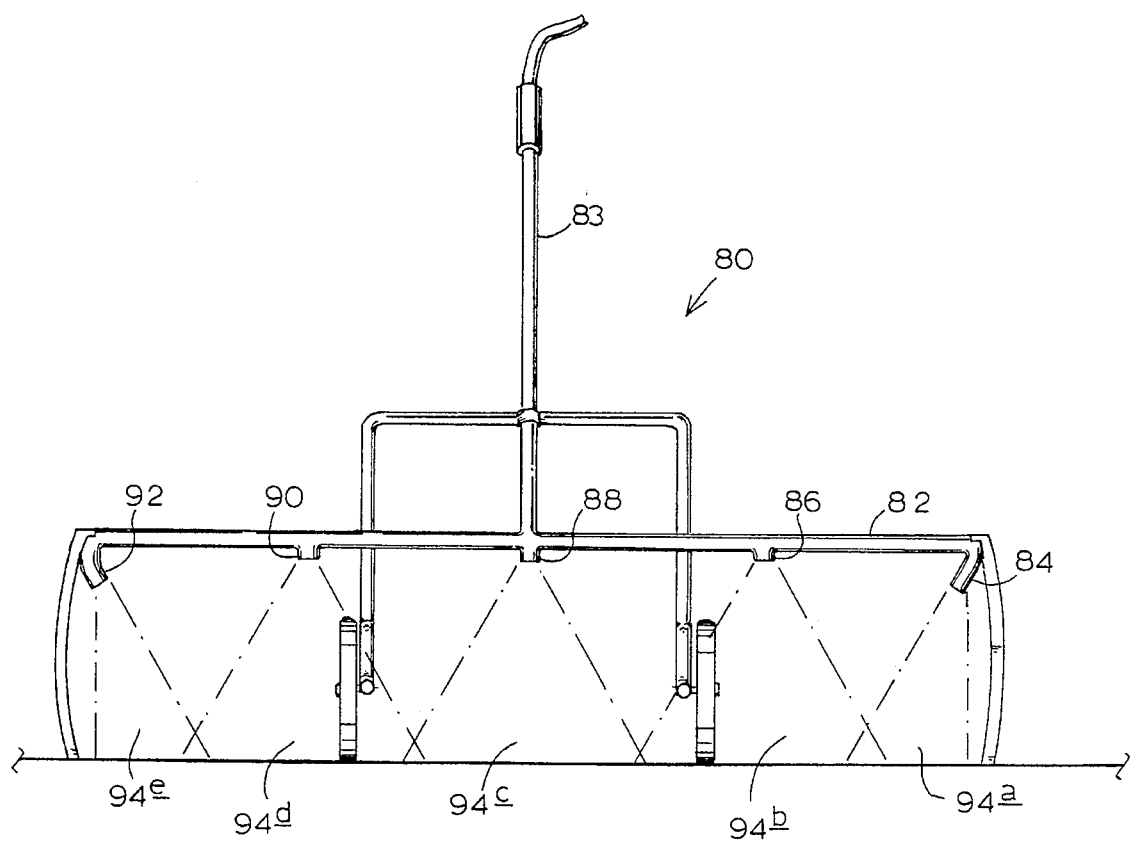
FIG. 6 is a schematic end view of another apparatus for applying penetrant composition on a roof.

FIG. 6 shows another applicator which has a longer cross bar, i.e., more nozzles for, collectively, covering a larger roof area. Applicator 80 is structurally similar to applicator 50, except cross bar 82 extends equidistantly in opposite lateral directions perpendicular to shaft 83. Cross bar 82 supports and provides pressurized penetrant composition to nozzles 84, 86, 88, 90 and 92, which in turn spray penetrant composition into areas 94a, 94b, 94c, 94d and 94e, respectively. Cross bar 82 (also referred to as the "wet-boom") is approximately 44-inches long. Applicator 80 sprays penetrant composition uniformally in a band having a width of approximately 40-inches. Cross bar 82 is approximately 10- to 12-inches above the surface of the roof, so that it goes over most vent pipes or other potential obstructions which are typically found on roofs.

Penetrant composition is preferably stored in plastic containers in order to avoid rust contamination which may result from the use of metal containers.

Various modifications and alterations of this invention will be obvious to those skilled in the art without departing from the spirit and scope of this invention, and it should be understood that the claimed invention is not limited to the illustrative embodiments set forth herein. For example, the inventive composition has other beneficial effects such as killing lichens including fungus.

What is claimed is:

1. A penetrant composition for applying to and penetrating into a porous weather exposed surface material to prevent moss growth and to render the surface fire resistant, the composition comprising:

an aqueous solution having a pH of at least 11.0 containing $Na_2O$ and $SiO_2$ wherein the combined concentration of $Na_2O$ and $SiO_2$ is between 10-percent and 30-percent (W/V);

a surfactant composition which is capable of increasing the permeability of the penetrant composition into the surface material without causing the $Na_2O$ and $SiO_2$ to precipitate; and a pigmented colorant which is compatible with a highly alkaline aqueous solution, the concentration of colorant being high enough so that application of approximately 0.75 gallon of penetrant composition per 100 square feet of roof visibly alters the color of the roof.

2. A method of preventing parasitic growth on a porous weather exposed surface material, the method comprising the steps of:

providing an aqueous penetrant solution having a pH of at least 11.0 comprising $Na_2O$ and $SiO_2$ at a combined concentration between 10-percent and 30-percent (W/V);

translating a boom along a path across a roof, wherein the boom is substantially parallel to the roof and perpendicular to the direction of the path;

pumping the aqueous penetrant solution through plural nozzles distributed equidistantly across the boom;

applying at least approximately 0.75 gallons of the solution per 100 square feet of the surface material; and allowing the solution to dry on and in the surface material at ambient temperatures.

* * * * *